Patented June 30, 1925.

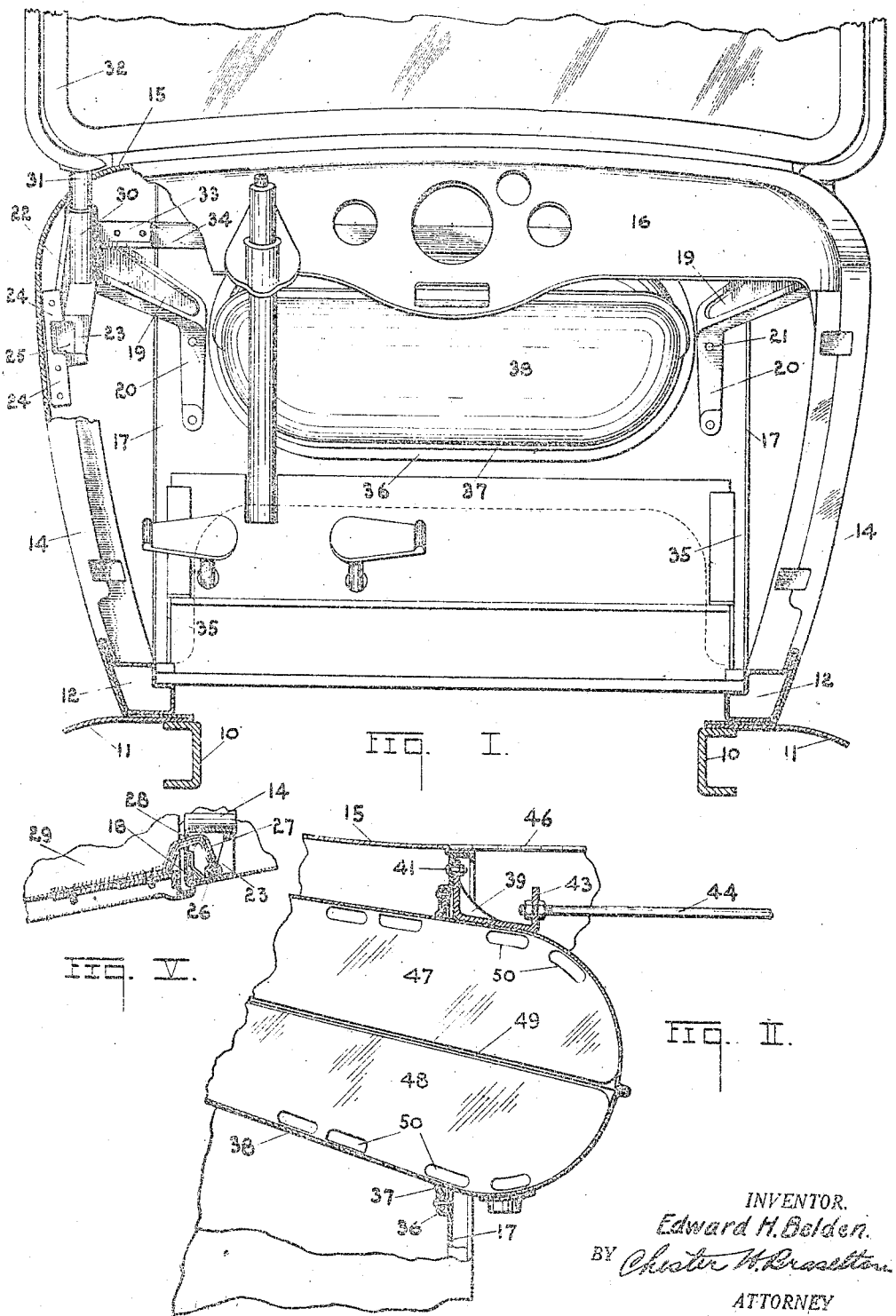

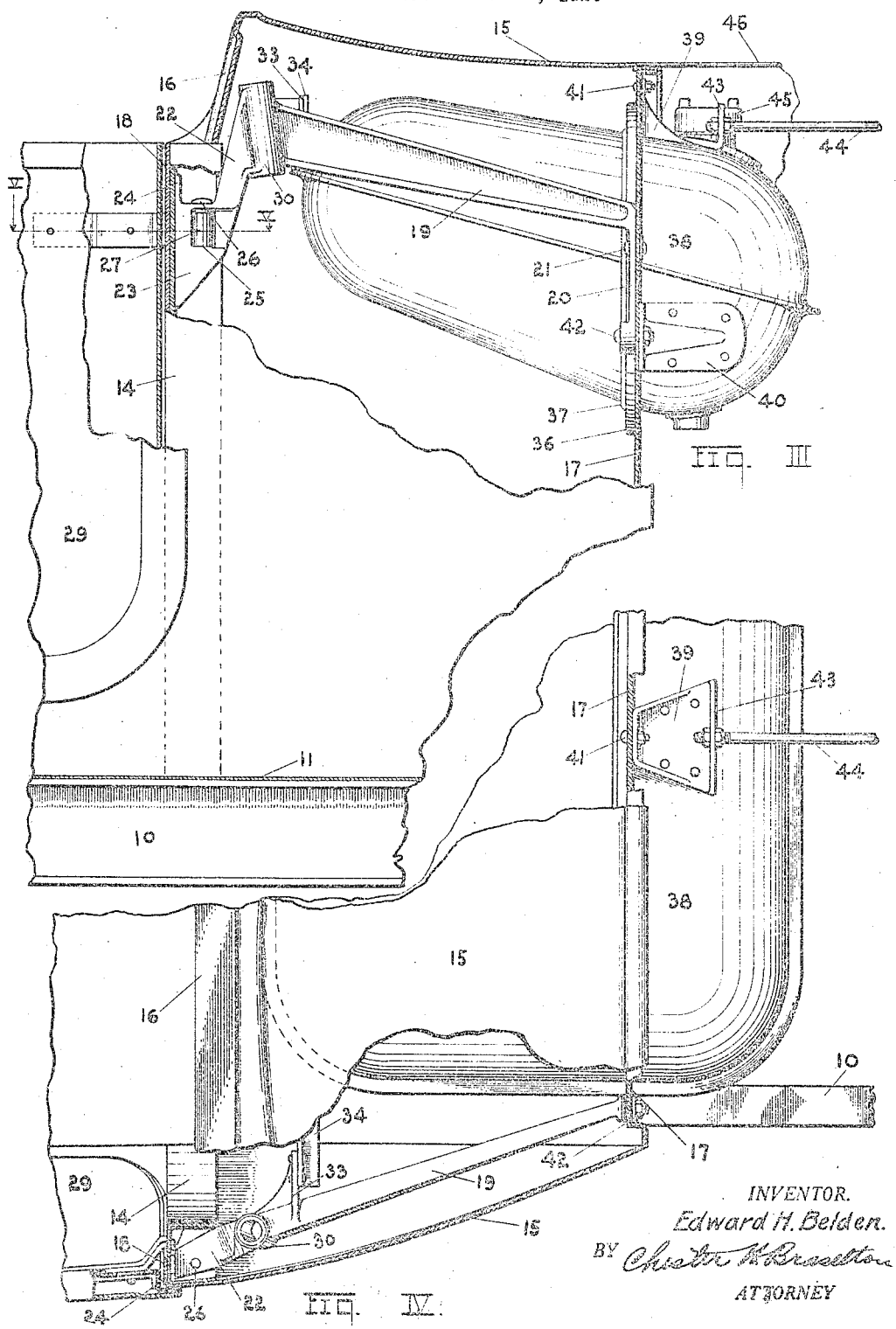

1,543,819

UNITED STATES PATENT OFFICE.

EDWARD H. BELDEN, OF TOLEDO, OHIO, ASSIGNOR TO THE WILLYS-OVERLAND COMPANY, OF TOLEDO, OHIO, A CORPORATION OF OHIO.

MOTOR VEHICLE.

Application filed November 22, 1920. Serial No. 425,898.

*To all whom it may concern:*

Be it known that I, EDWARD H. BELDEN, residing at Toledo, in the county of Lucas and State of Ohio, have invented certain new and useful Improvements in Motor Vehicles, of which I declare the following to be a full, clear, and exact description.

My invention relates to motor vehicles and has for its object to provide improved means for suspending the fuel tank and bracing the body of the automobile, together with means for supporting the windshield upon the body, the present embodiment constituting an improvement over my copending application filed August 26, 1920 and bearing Serial Number 406,187.

Another object of the invention is to provide a combined windshield support and brace or tie between the dash and door post of the vehicle body whereby a saving in a number of parts and a consequent saving in cost of manufacture is afforded.

Another object of the invention is to provide improved means for bracing or tying the windshield brackets together.

Other improvements include the manner of mounting the fuel tank to permit it to be readily removed without requiring the disconnecting of a number of more or less inaccessible parts.

With these and other objects in view, the invention contemplates any and all forms of construction and arrangement of parts in keeping with the spirit of the invention as expressed in the appended claims, which may be found desirable to use under varying conditions from time to time.

A structure constituting one embodiment of the invention is illustrated in the accompanyings, in which:

Figure I is a transverse section through the body of the car, looking forward from the driver's seat, showing the instrument board, the fuel tank, windshield supports and other parts constituting a portion of the body structure.

Figure II is a fragmentary sectional elevation taken longitudinally through the fuel tank and supporting structure therefor.

Figure III is a fragmentary side elevation, certain parts being broken away and others shown in section to more clearly illustrate the mounting of the fuel tank and windshield brackets between the side door posts and the dash.

Figure IV is a fragmentary plan, partly in section, illustrating a portion of the fuel tank and one of the supports therefor, together with the manner of mounting the windshield brackets between the dash and the side door posts, and Figure V is a detailed section taken on line V—V of Figure III.

Similar reference characters refer to similar parts throughout the several views of the drawing.

The structure illustrated in the drawings comprises the side frame members 10 carrying the dust guards 11 upon which are mounted the lower side rails 12 provided with the upstanding door posts 14 which are adapted to support the rear end of the cowl 15. The instrument board 16 is suitably connected with the cowl, the front end of the latter being carried by the dash 17 as shown in Figure III. The rear end of the cowl at the sides thereof is preferably turned inwardly to engage the inner faces of the door posts 14 as indicated at 18 in Figure IV. Connecting the dash 17 and door posts 14 are the windshield brackets 19 having at their forward ends the downturned portions 20 which are disposed upon the rear face of the dash and suitably connected therewith as by means of the rivets 21. The windshield brackets, at their rear ends, are provided with downwardly extending angular portions 22 provided with enlarged portions 23 disposed within the channeled door posts 14 as shown in Figures III and IV, said enlarged portions being provided with oppositely extending plate portions 24 secured upon the door posts by any suitable means. The enlarged portions 23 of the brackets are provided with recesses 25 through which extend the pins 26 adapted to receive the side door hinges 27 which preferably extend through slots 28 in the door posts and are suitably connected with the door 29 as indicated in Figure V. The windshield brackets 19 are provided with sockets 30 adapted to receive the windshield posts 31 upon which is mounted the windshield 32 as shown in Figure I. The windshield brackets are provided at points adjacent the sockets 30 with inwardly extending lugs or projections 33 with which is suitably connected a transverse tie 34 serving to brace or tie the windshield brackets together, thereby bracing the windshield posts as well as forming a tie between the side door posts and rear side portions of the cowl.

The dash 17 is provided at its opposite ends with downwardly extending legs 35 which are suitably connected with the frame structure of the vehicle at the sides thereof. A central opening is formed in the dash and surrounded by a rearwardly extending flanged portion 36 carrying a ring 37 of felt or other flexible material yieldingly engaging the fuel tank 38 which projects through the dash as shown in Figures II and III. The tank is supported by a three-point suspension including the central bracket 39 and the two side brackets 40, each of which is securely riveted or otherwise secured to the tank in front of the dash. The bracket 39 is preferably connected with the dash by means of a bolt 41, while the brackets 40 are secured thereto by means of bolts 42 which preferably extend through the lower ends of the downwardly extending portions 20 of the windshield brackets 19. The bracket 39 is provided with an upstanding flange 43 with which is connected a brace rod 44 extending to the top of the radiator (not shown) whereby the tank and radiator are securely tied together. The tank may be readily removed from the dash by disconnecting the brace rod 44 and unscrewing the nuts on the bolts 41 and 42, after which it may be withdrawn from the dash by sliding it forwardly therefrom. The tank is preferably tapered towards the rear end and is inclined upwardly as shown in Figure III so that the forward end is considerably lower than the rear end. The center of gravity of the tank when substantially filled will fall at a point adjacent the dash, whereby it is more perfectly balanced and the dash thereby relieved of excessive strains and stresses. The tank is provided in front of the dash and at one side of the bracket 39 with a filling nozzle 45 which is disposed immediately under the hood 46 as shown in Figure III.

Extending centrally through the tank longitudinally of the vehicle, are the upper and lower reinforcing plates 47 and 48 respectively, which serve as baffles for the liquid and which are preferably spaced apart as indicated at 49 to permit the fuel to pass freely from one side of the tank to the other. The baffles are provided with a plurality of openings 50 which also serve to permit the fuel to pass from one compartment to the other.

While I have shown and described in considerable detail a specific embodiment of my invention, it is to be understood that the present showing and description is illustrative only, and that I do not regard the invention as limited to the details of construction illustrated and described, nor any of them, except insofar as I have included such limitations within the terms of the following claims, in which it is my intention to claim all novelty inherent in my invention broadly as well as specifically.

Having thus described my invention, what I claim as new and desire to secure by Letters Patent, is:

1. In a motor vehicle, the combination of a frame structure including a dash and side door posts, brackets extending from the dash to the side door posts and connecting the same, windshield supports carried by said brackets, a tie connecting said brackets, and a fuel tank supported by said dash.

2. In a motor vehicle, the combination of a frame structure including a dash and side door posts, brackets connecting the dash and side door posts, a tie connecting said brackets, and a tank carried by said dash.

3. In a motor vehicle, the combination of a frame structure, including a cowl, a transverse plate member and upright frame members spaced therefrom, members within the cowl connecting said transverse plate member and said upright members, and a tank projecting through and supported entirely by said transverse plate member.

4. In a motor vehicle, the combination of a frame structure including a transverse plate, a fuel tank projecting through said plate, and a three-point suspension for the tank carried by the plate.

5. In a motor vehicle, the combination of a dash, a fuel tank projecting therethrough, a pair of brackets secured upon the tank at the opposite sides thereof and connected with the dash, and a third bracket secured upon the top of the tank and connected with the dash.

6. In a motor vehicle, the combination of a frame structure including a dash, a fuel tank projecting through the dash, a plurality of supporting brackets connected with the tank in front of the dash, and means removably connecting said brackets with said dash.

7. In a motor vehicle, the combination of a frame structure including a dash, a fuel tank projecting through said dash, a plurality of brackets connected with the tank in front of the dash, means removably connecting the brackets with the dash, and a forwardly extending brace member connected with one of said brackets.

8. In a motor vehicle, the combination of a frame structure including a dash, a fuel tank projecting therethrough, a plurality of brackets connected with the tank in front of the dash adapted to support the entire weight of the tank, and means connecting the bracket with the dash.

9. In a motor vehicle, the combination of a frame structure including a dash, a fuel tank projecting through the dash, a plurality of brackets connected with the tank in front of the dash, means connecting said brackets with the dash, and a yieldable member carried by the dash and surrounding the tank.

10. In a motor vehicle, the combination of a frame structure including a dash, a fuel tank projecting through the dash, and means disposed entirely in front of the dash for supporting said tank.

11. In a motor vehicle, the combination of a frame structure including a dash, a tank projecting through the dash, means disposed entirely in front of the dash for supporting said tank, and a brace member extending forwardly from the tank.

12. In a motor vehicle, the combination of a frame structure including a dash, a fuel tank projecting through the dash, a plurality of supports for the tank disposed in front of the dash and removably connected therewith, and braces extending rearwardly from the dash on opposite sides of the tank and connected with said frame structure.

13. In a motor vehicle, the combination of a frame structure including a dash, a fuel tank projecting through the dash, a plurality of supports for the tank disposed in front of and connected with the dash, a brace extending forwardly from one of said supports, and a pair of braces extending rearwardly from the dash on opposite sides of the tank.

14. In a motor vehicle, the combination of a frame structure including a dash and side door posts, a pair of braces extending rearwardly from the dash and connected with said posts, a fuel tank projecting through the dash between said braces, and three supporting members for the tank disposed in front of the dash and connected therewith.

15. In a motor vehicle, the combination of a frame structure including a dash, a tank projecting through the dash, supports for the tank extending laterally from the dash and independently connected therewith, and means independent of the tank adapted to brace the dash intermediate its ends.

16. In a motor vehicle, the combination of a frame structure including a dash, a tank projecting through the dash, and supports connected with the tank and removably connected with the dash whereby the tank and supports are removable as a unit.

17. In a motor vehicle, the combination of a frame structure including a dash, a tank projecting through the dash, a bracket secured to the tank, and a brace for the tank extending from the bracket.

18. In a motor vehicle, the combination of a frame structure including a dash having an opening therein and a flange around said opening, a tank projecting through the opening in spaced relation to the flange, a strip carried by the flange and yieldingly engaging the tank, and means connecting the tank with the dash.

In testimony whereof, I affix my signature.

EDWARD H. BELDEN.